United States Patent
Wang

(10) Patent No.: US 7,898,596 B2
(45) Date of Patent: Mar. 1, 2011

(54) METHOD AND DEVICE OF AUTOMATIC DETECTION AND MODIFICATION OF SUBTITLE POSITION

(75) Inventor: Jiunn-Shyang Wang, Hsin-Tien (TW)

(73) Assignee: Via Technologies, Inc., Taipei County (TW)

( * ) Notice: Subject to any disclaimer, the term of this patent is extended or adjusted under 35 U.S.C. 154(b) by 1874 days.

(21) Appl. No.: 10/986,149

(22) Filed: Nov. 12, 2004

(65) Prior Publication Data

US 2006/0088291 A1    Apr. 27, 2006

(30) Foreign Application Priority Data

Oct. 22, 2004    (TW) ............................... 93132181 A

(51) Int. Cl.
*H04N 7/00* (2006.01)
*H04N 11/00* (2006.01)

(52) U.S. Cl. ....................................................... 348/468

(58) Field of Classification Search .................. 348/468, 348/461, 460, 569, 563–565
See application file for complete search history.

(56) References Cited

U.S. PATENT DOCUMENTS

| | | | | |
|---|---|---|---|---|
| 5,477,274 A | * | 12/1995 | Akiyoshi et al. | 348/468 |
| 5,546,131 A | * | 8/1996 | Terry | 348/564 |
| 5,680,176 A | | 10/1997 | Cho | |
| 2002/0075403 A1 | * | 6/2002 | Barone et al. | 348/461 |
| 2004/0021794 A1 | * | 2/2004 | Nakayama et al. | 348/468 |
| 2007/0121005 A1 | * | 5/2007 | Gutta et al. | 348/468 |

FOREIGN PATENT DOCUMENTS

| | | |
|---|---|---|
| CN | 1139338 | 1/1997 |
| JP | 2004208014 | 7/2004 |

* cited by examiner

*Primary Examiner* — M. Lee
(74) *Attorney, Agent, or Firm* — Thomas, Kayden, Horstemeyer & Risley, LLP

(57) ABSTRACT

A method and device of automatic detection and modification of subtitle position comprises the steps of comparing an active display area parameter of a displaying device to an original subtitle control signal to generate a comparison result, and outputting a targeted subtitle control signal to modify the position of the subtitle depends on the comparison result so that the subtitle is guaranteed to display in the active display area. Accordingly, the subtitle position detection and modification method and device may not only as a solution of improper subtitle display position arrangement, but also excite the viewer's joy of the sight and eliminate the inconvenience of the complicated adjusting operations.

17 Claims, 5 Drawing Sheets

METHOD AND DEVICE OF AUTOMATIC DETECTION AND MODIFICATION OF SUBTITLE POSITION

BACKGROUND OF THE INVENTION

1. Field of Invention

The invention relates to a subtitle position detection and modification method and device, in particular, to the method and device of subtitle position detection and modification according to an active display area of displaying device.

2. Related Art

The species, stability, capacity, application and playing device of storage medium evolving into variety since the technology progressing and the higher demand of quality of audio and video. For example, the digital versatile disc (DVD) applies MPEG compression technique to create high quality dynamic image, and provides the sub picture/subtitle mechanism for the purpose of improving interaction between the digital contents and the audience. Moreover, the sub picture/subtitle file includes many subtitles and menus so that the DVD may support at most 32 subtitle streams, and the digital content provider can design various menus, tags, auxiliaries for aurally handicapped person auxiliary, simple animation, and subtitles supporting multi-languages mode.

In practice, the source of video, audio, and sub picture/subtitle file encoded by corresponding encoder respectively, and then mixed up to form a DVD image file stored in a DVD disc, whereas the playing system decodes corresponding encoded data stream and then forwards to a displaying device such as a television. FIG. 1 is a schematic block diagram of the playing procedures of a DVD player according to the prior art, herein a data stream separating unit 110 of the playing system separates MPEG video data stream, audio data stream, and sub picture data stream from the source data stream of the data source 100, and then decoding them by corresponding decoder respectively. For instance, the MPEG video data stream is decoded by a MPEG decoder 120, the audio data stream is decoded by an AC-3 decoder 130, and the sub picture data stream is decoded by a sub picture decoder 140. Hence the decoded MPEG video data stream and sub picture data stream are mixed up by a mixer 150 and converted by a first D/A converter 160 to generate a video output to the playing unit 180, whereas the decoded audio data stream is converted by a second D/A converter 170 to generate a audio output to the playing unit 180.

The subtitle file includes the bitmap format subtitle data and subtitle control signal, and the DVD player reading and decoding the subtitle file from the data source 100 to obtain the bitmap format subtitle data, binding it with image duly to display in the preset subtitle displaying position depends on the corresponding parameters, such as time and position, and then generating and transmitting the frames within subtitles to the display device.

However, the subtitles or parts of them may not adapt to the active display area of the displaying device which is probably caused by improper arrangement of subtitle during DVD producing process, and it will affect the delights of audience, increase the inconvenience, and so much as decrease the quality of the frame. It is therefore a subjective of the invention to provide the subtitle position detection and modification method and device as a solution of improper subtitle display position arrangement, but also eliminate the inconvenience of the complicated adjusting operations and improve vision qualities and feelings of user.

SUMMARY OF THE INVENTION

In view of the foregoing, the invention is to provide a device of automatic detection and modification of subtitle position, which comprises a comparison unit and a control signal adjusting unit. In the invention, the comparison unit comparing an active display area parameter of a displaying device to an original subtitle control signal such as to generate a comparison result; and the control signal adjusting unit outputting a targeted subtitle control signal to modify an original subtitle position such as to display in the active display area according to the comparison result. Herein, the device includes an active display area detecting unit for detecting and outputting the active display area parameter to the comparison unit, or an active display area receiving unit for the user to input the active display area parameter. Besides, the device includes a decoding module for decoding a subtitle source such as to generate targeted subtitle data and the original subtitle control signal. Moreover, the device further includes an overlapping unit for overlapping a MPEG-2 or MPEG-4 encoded and decoded video signal, a targeted subtitle data, and the targeted subtitle control signal to output to a displaying device, thus the original subtitle data is guaranteed to display in the active display area.

In addition, the invention provides an method of automatic detection and modification of subtitle position, which comprises the steps of comparing an active display area parameter of a displaying device to an original subtitle control signal and then generating a comparison result, and then outputting a targeted subtitle control signal according to the comparison result such as to modify an original subtitle position to a preset subtitle displaying position of the active display area. In addition, the method includes a step of detecting the displaying device to obtain the active display area parameter, or receiving the active display area parameter inputted by the user from an active display area receiving unit. Moreover, the method includes steps of decoding a subtitle source such as to generate a targeted subtitle data and the original subtitle control signal, and overlapping the video signal, a targeted subtitle data, and the targeted subtitle control signal such as to output to the displaying device. In such a case, the original subtitle data can be displayed in the active display area of the display device so that the viewer can enjoy better sight of the medium contents according to the assistance of the subtitle.

Furthermore, the invention provides a device of automatic detection and modification of subtitle position applying for a digital playing system, which comprises a medium receiving unit for receiving a digital medium and file such as a DVD disc with MPEG-2 or MPEG-4 encoded format file, a stream separating unit for separating data streams of the digital medium; a decoding module for decoding the data streams of the digital medium such as to generate a targeted subtitle data and an original subtitle control signal; a comparison unit for comparing an active display area parameter of a displaying device to an original subtitle control signal to generate a comparison result; and a control signal adjusting unit for outputting a targeted subtitle control signal to modify an original subtitle position to display in the active display area according to the comparison result.

As mentioned above, the subtitle position detection and modification method and device may not only as a solution of improper subtitle display position arrangement, but also excite the viewer's joy of the sight and eliminate the inconvenience of the complicated adjusting operations. Hence, the invention has extra auxiliary effects on aurally handicapped person since the subtitle can be displayed in the active display area of the displaying device, such as a monitor or a television.

BRIEF DESCRIPTION OF THE DRAWINGS

In view of the subtitles or parts of them may not adapt to the active display area of the displaying device which is probably caused by improper arrangement of subtitle during DVD producing process, the present invention provides a method and device of automatic detection and modification of subtitle position, and the invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings.

Figure 1:
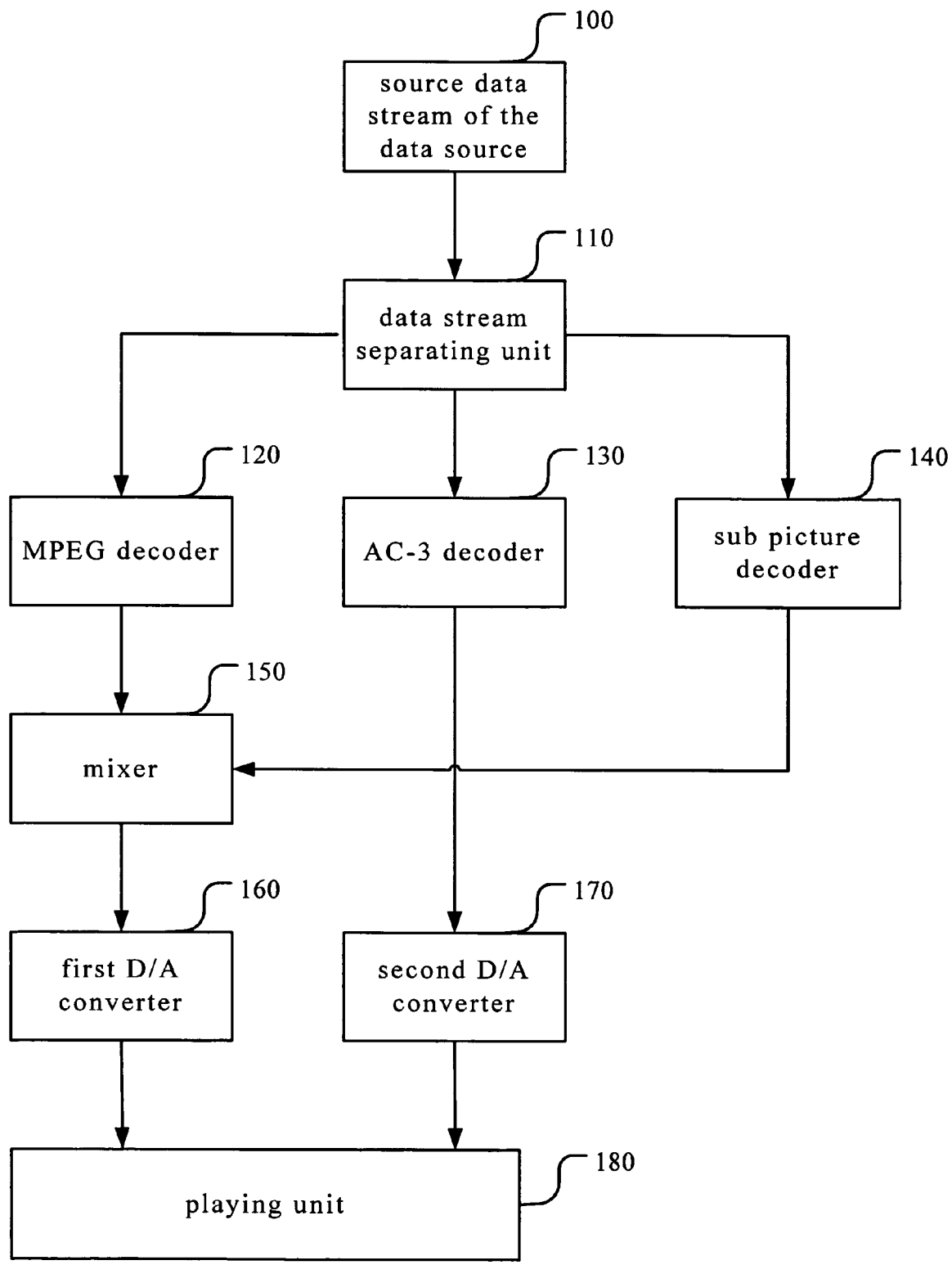
FIG. 1 is a schematic block diagram showing the playing procedures of a DVD player according to the prior art.
Figure 2:
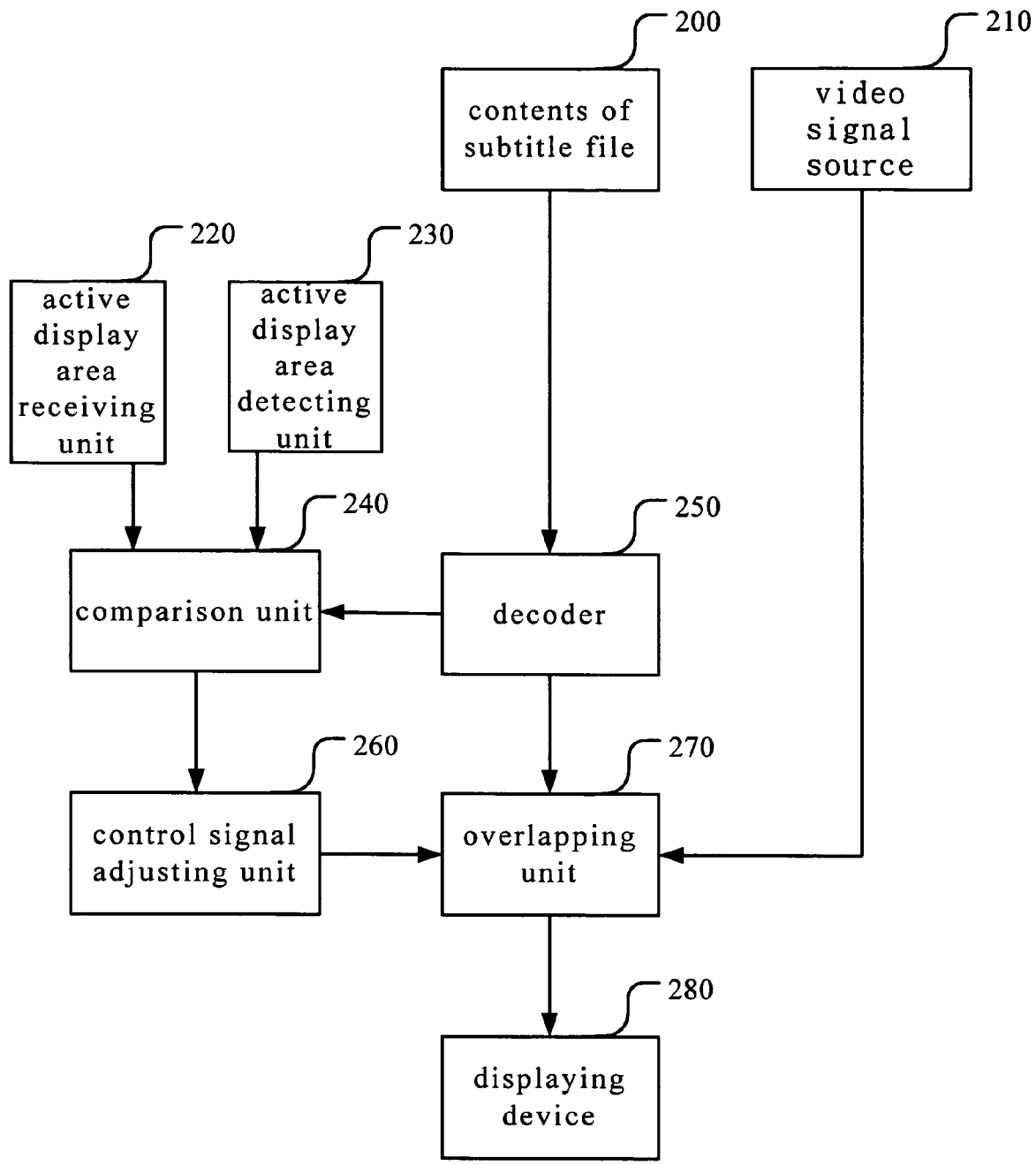
FIG. 2 is a schematic block diagram of the device for automatic detection and modification of subtitle position according to a preferred embodiment of the invention.

FIG. 2 is a schematic block diagram of the device for automatic detection and modification of subtitle position according to a preferred embodiment of the invention. In the embodiment, the device for automatic detection and modification of subtitle position comprises a comparison unit 240 for comparing an active display area parameter of a displaying device 280 to an original subtitle control signal to generate a comparison result, and a control signal adjusting unit 260 for outputting a targeted subtitle control signal, such as a coordinate of a preset subtitle displaying position of the active display area, to modify an original subtitle position to display in the active display area according to the comparison result. Furthermore, the device includes an overlapping unit 270 for overlapping a video signal source 210 having a video signal encoded and decoded in MPEG-2 or MPEG-4 format, a targeted subtitle data, and the targeted subtitle control signal, and then the output of overlapping unit 270 may be transmitted to a displaying device 280.

Again, with reference to FIG. 2, the device of the embodiment further includes a decoding module 250 for decoding a subtitle source 200 such as to generate a targeted subtitle data and an original subtitle control signal, wherein the targeted subtitle data is sent to the overlapping unit 270, and the original subtitle control signal is sent to the comparison unit 240. Furthermore, the device of the embodiment further includes an active display area detecting unit 230 for detecting and outputting the active display area parameter of the displaying device 280 to the comparison unit 240.

Besides, the device of another embodiment further includes an active display area receiving unit 220 for receiving the active display area parameter inputted in a inputting device (not shown in FIG. 2) such as a remote controller, a button, or a panel by the user, and outputting the active display area parameter to the comparison unit 240.

Figure 3:
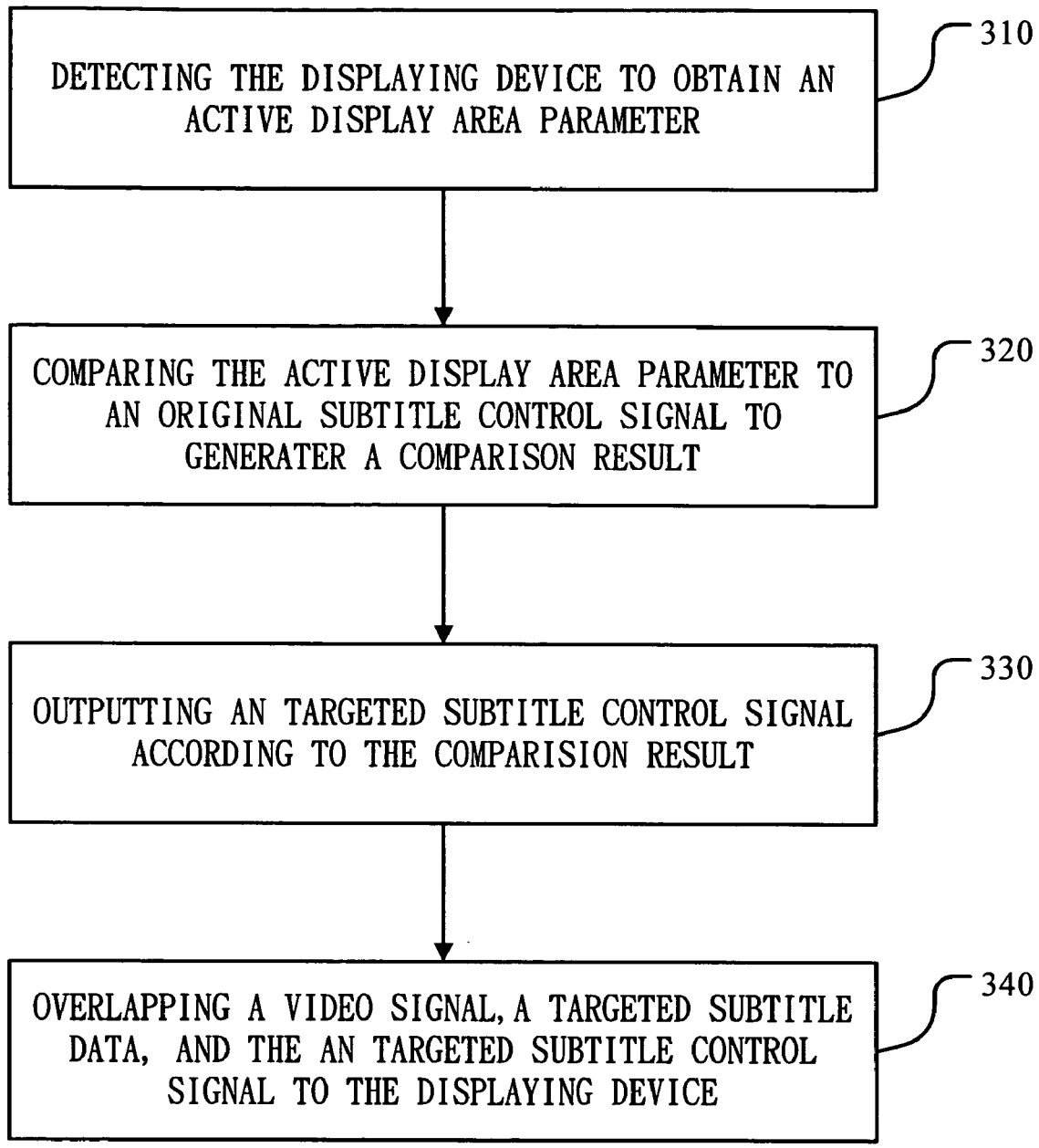
FIG. 3 is a flow chart showing the steps of the method for automatic detection and modification of subtitle position according to a preferred embodiment of the invention.

FIG. 3 is a flow chart showing the steps of the method for automatic detection and modification of subtitle position according to a preferred embodiment of the invention. Firstly, comparing an active display area parameter of a displaying device to an original subtitle control signal, and then generating a comparison result in step 320. Secondly, outputting a targeted subtitle control signal to modify the original subtitle position to a preset subtitle displaying position of the active display area according to the comparison result which indicates whether the original subtitle position needs to be adjusted or not in step 330. Lastly, overlapping a video signal, a targeted subtitle data, and the targeted subtitle control signal and outputting to the displaying device in step 340. In the embodiment, the method further includes that detecting the displaying device to obtain the active display area parameter in step 310. Besides, In another embodiment, the method includes that receiving the active display area parameter from an active display area receiving unit by the user's demand.

Figure 4:
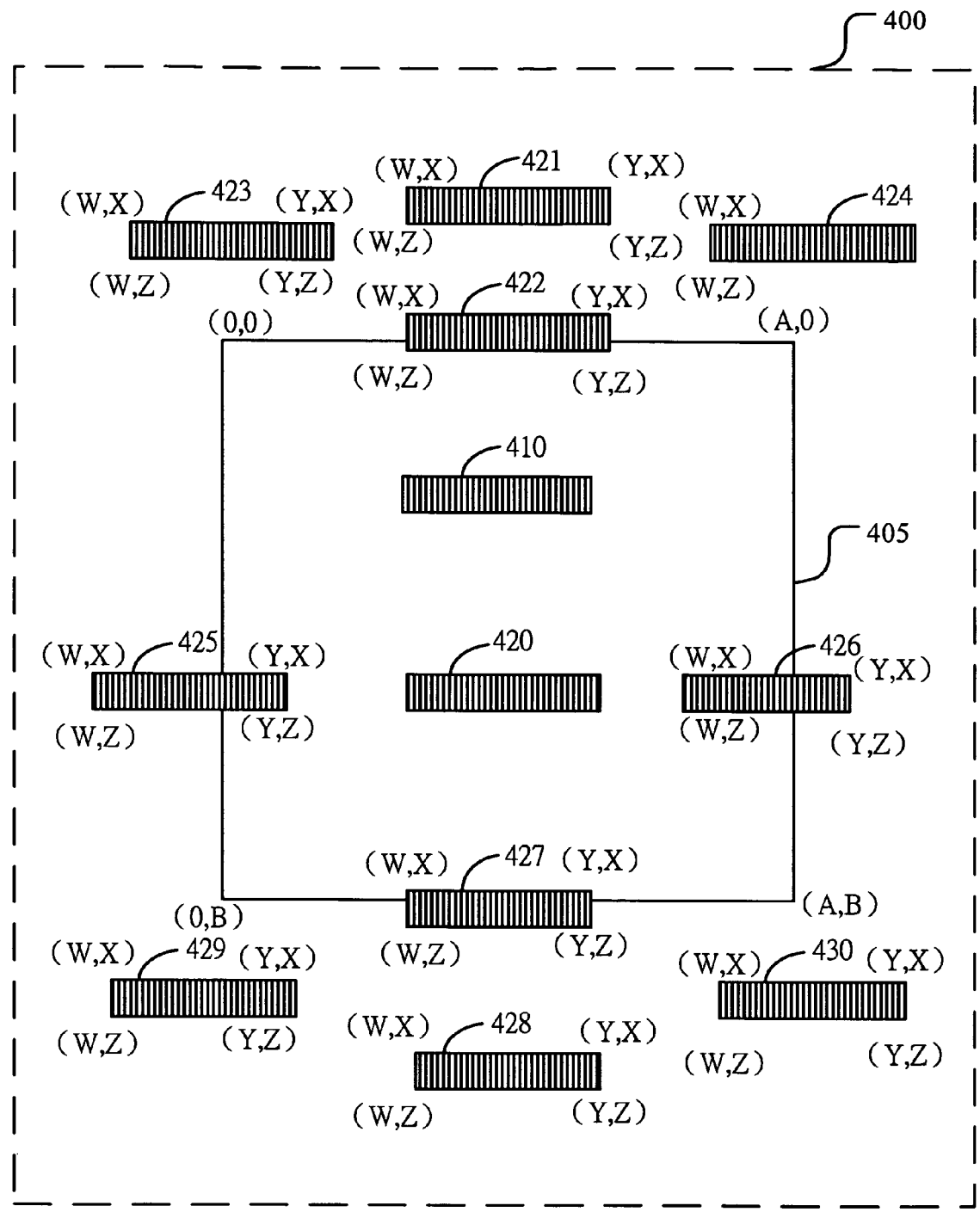
FIG. 4 is a schematic view showing the subtitle position according to the original subtitle control signal.

FIG. 4 is a schematic view showing the subtitle position according to the original subtitle control signal. In the embodiment, displaying system 400 having an active display area 405, and the active display area parameter of the active display area 405 includes a first top left coordinate (0, 0), a first top right coordinate (A, 0), a first bottom left coordinate (0, B) and a first bottom right coordinate (A, B), and the original subtitle control signal, such as one of 421 to 430, comprises a second top left coordinate (W, X), a second top right coordinate (Y, X), a second bottom left coordinate (W, Z) and a second bottom right coordinate (Y, Z). It's noted that the active display area parameter, the position, coordinate value and number of the original subtitle position, and the position, coordinate value and number of the preset subtitle displaying position are not limited to that shown in FIG. 4. In order to guarantee that the subtitle is displayed in the active display area 405, Once X is less than zero, W is less than zero, Z is greater than B, or Y is greater than A so that the original subtitle position is totally or partially out of the active display area 405, the comparison result is outputted to modify the original subtitle position. Therefore if the comparison result indicates that the original subtitle position needs to be adjusted, the process of outputting the targeted subtitle control signal to modify the original subtitle position to a preset subtitle displaying position of the active display area, such as 410 or 420, in step 330 of FIG. 3. It's noted that if there exist many preset subtitle displaying position, the selection of the preset subtitle displaying position depends on the shortest distance between the original subtitle position modified by the targeted subtitle control signal and the preset subtitle displaying position. And then the video signal, the targeted subtitle data, and the targeted subtitle control signal could be overlap and output to the displaying device in step 340, and the subtitle data will be display in the active display area 405. Besides, if the comparison result indicates that the original subtitle position needs not to be adjusted in step 330, overlapping the video signal, the targeted subtitle data and the original subtitle control signal in step 340, and then outputting to the display device 400 as ordinary operation.

Figure 5:
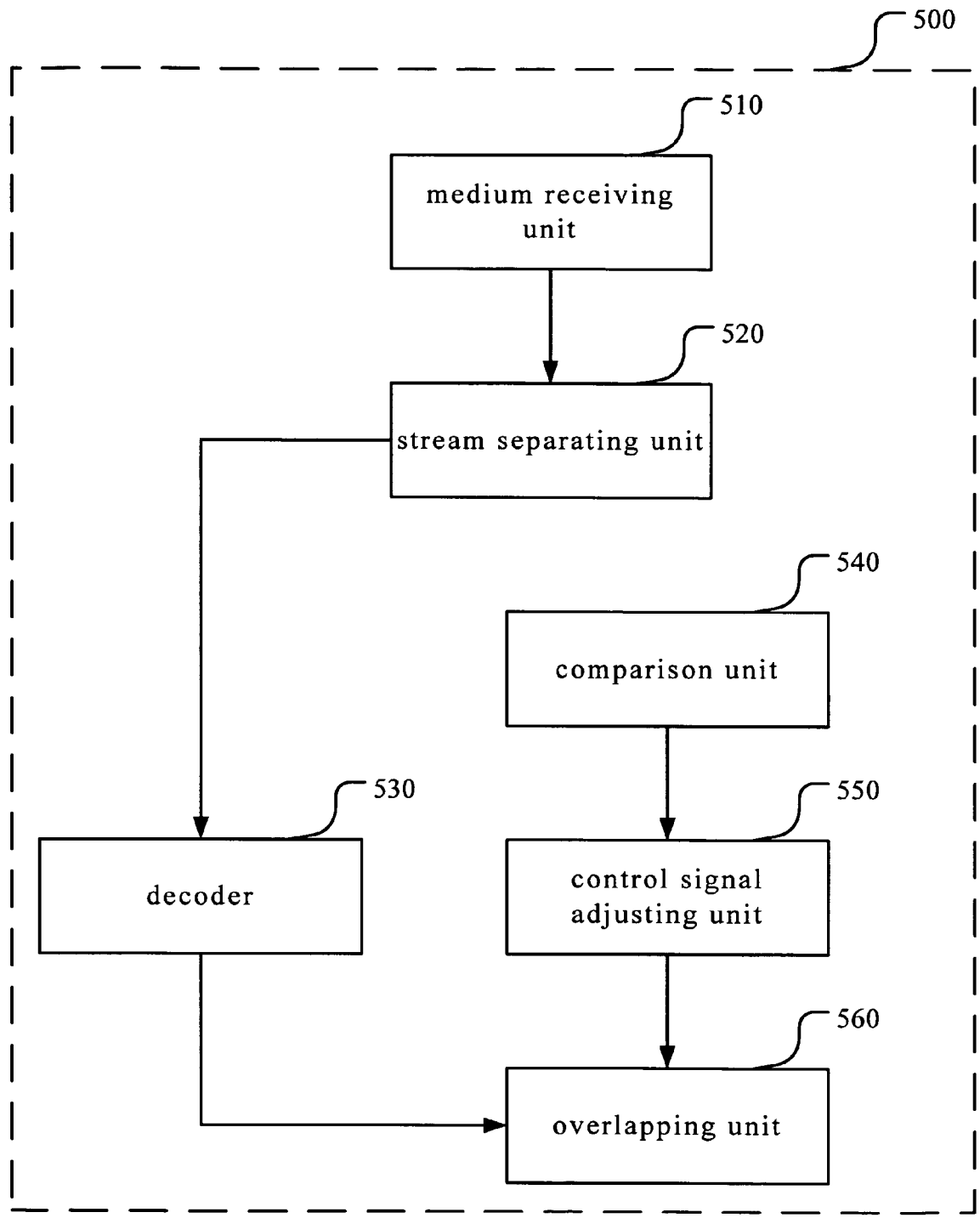
FIG. 5 is a schematic block diagram of the device for automatic detection and modification of subtitle position according to another preferred embodiment of the invention.

FIG. 5 is a schematic block diagram of the device for automatic detection and modification of subtitle position according to another preferred embodiment of the invention, and the device applying for a digital playing system 500, such as a DVD player. In the embodiment, the device comprises a medium receiving unit 510 for receiving a digital medium or file such as a DVD disc with the MPEG-2 encoded format file, and a DivX file supporting subtitle format and encoded in MPEG-4 format; a stream separating unit 520 for separating data streams of digital medium or file; a decoding module 530 for decoding the data streams of the digital medium such as to generate a targeted subtitle data and an original subtitle control signal; a comparison unit 540 for comparing an active display area parameter of a displaying device to an original subtitle control signal to generate a comparison result; and a control signal adjusting unit 550 for outputting a targeted subtitle control signal to modify an original subtitle position to display in the active display area according to the comparison result. Besides, if the comparison result indicates that the original subtitle position needs not to be adjusted, overlapping the video signal, the targeted subtitle data and the original subtitle control signal, and then outputting to the display device as ordinary operation.

The method and device of automatic detection and modification of subtitle position can be accomplished by the firmware and the logic circuits.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A device of automatic detection and modification of subtitle position, comprising:
   a comparison unit for comparing an active display area parameter of a displaying device to an original subtitle control signal to generate a comparison result, wherein the active display area parameter comprises a first top left coordinate (0,0), a first top right coordinate (A,0), a first bottom left coordinate (0, B) and a first bottom right coordinate (A, B), and the original subtitle control signal comprises a second top left coordinate (W, X), a second top right coordinate (Y, X), a second bottom left coordinate (W, Z) and a second bottom right coordinate (Y, Z); and
   a control signal adjusting unit for outputting a targeted subtitle control signal to modify an original subtitle position to display in the active display area according to the comparison result if X is less than zero, W is less than zero, Z is greater than B, or Y is greater than A.

2. The device of claim 1, further comprising:
   a decoding module for decoding a subtitle source such as to generate a targeted subtitle data and the original subtitle control signal.

3. The device of claim 2, further comprising:
   an overlapping unit for overlapping a video signal, the targeted subtitle data, and the targeted subtitle control signal such as to output to the displaying device.

4. The device of claim 3, wherein the source of the video signal is a file encoded and decoded in MPEG-2 or MPEG-4 format.

5. The device of claim 1, wherein the targeted subtitle control signal comprises a coordinate of a preset subtitle displaying position of the active display area.

6. The device of claim 1, further comprising:
   an active display area detecting unit for detecting and outputting the active display area parameter to the comparison unit.

7. The device of claim 1, further comprising:
   an active display area receiving unit for receiving the active display area parameter from a inputting device, and outputting the active display area parameter to the comparison unit.

8. A method of automatic detection and modification of subtitle position, comprising:
   comparing an active display area parameter of a displaying device to an original subtitle control signal and then generating a comparison result, wherein the active display area parameter comprises a first top left coordinate (0,0), a first top right coordinate (A,0), a first bottom left coordinate (0, B) and a first bottom right coordinate (A, B), and the original subtitle control signal comprises a second top left coordinate (W, X), a second top right coordinate (Y, X), a second bottom left coordinate (W, Z) and a second bottom right coordinate (Y, Z):
   outputting the comparison result if X is less than zero, W is less than zero, Z is greater than B, or Y is greater than A by comparing the active display area parameter and the original subtitle control signal parameter; and
   outputting a targeted subtitle control signal according to the comparison result such as to modify an original subtitle position to a preset subtitle displaying position of the active display area.

9. The method of claim 8, further comprising:
   detecting the displaying device to obtain the active display area parameter.

10. The method of claim 8, further comprising:
    receiving the active display area parameter inputted in a inputting device by an active display area receiving unit.

11. The method of claim 8, further comprising:
    decoding a subtitle source such as to generate a targeted subtitle data and the original subtitle control signal.

12. The method of claim 11, further comprising:
    overlapping a video signal, the targeted subtitle data, and the targeted subtitle control signal such as to output to the preset subtitle displaying position of the active display area.

13. A device of automatic detection and modification of subtitle position applying for a digital playing system, comprising:
    a medium receiving unit for receiving a digital medium or file;
    a stream separating unit for separating data streams of the DVD disc or file and generating a subtitle of a digital medium;
    a decoding module for decoding the data streams of the digital medium or file such as to generate a targeted subtitle data and an original subtitle control signal;
    a comparison unit for comparing an active display area parameter of a displaying device to an original subtitle control signal to generate a comparison result, wherein the active display area parameter comprises a first top left coordinate (0,0), a first top right coordinate (A,0), a first bottom left coordinate (0, B) and a first bottom right coordinate (A, B), and the original subtitle control signal comprises a second top left coordinate (W, X), a second top right coordinate (Y, X), a second bottom left coordinate (W, Z) and a second bottom right coordinate (Y, Z); and
    a control signal adjusting unit for outputting a targeted subtitle control signal to modify an original subtitle position to display in the active display area according to the comparison result, if X is less than zero, W is less than zero, Z is greater than B, or Y is greater than A.

14. The device of claim 13, further comprising:
    an overlapping unit for overlapping a video signal, the targeted subtitle data, and the targeted subtitle control signal such as to output to the displaying device.

15. The device of claim 13, further comprising:
    a displaying device detecting unit for detecting and outputting the active display area parameter to the comparison unit.

16. The device of claim 13, further comprising:
    an active display area receiving unit for receiving the active display area parameter and outputting the active display area parameter to the comparison unit.

17. The device of claim 13, wherein the digital medium and file comprises file in MPEG-2 or MPEG-4 encoded format and the storage thereof.

* * * * *